United States Patent [19]

Tamamura et al.

[11] 4,401,379
[45] Aug. 30, 1983

[54] FILM FEEDING DEVICE FOR CAMERA

[75] Inventors: Hideo Tamamura, Tokyo; Toru Nagata, Yokohama, both of Japan

[73] Assignee: Canon Kabushiki Kaisha, Tokyo, Japan

[21] Appl. No.: 358,580

[22] Filed: Mar. 16, 1982

[30] Foreign Application Priority Data

Mar. 25, 1981 [JP] Japan ................... 56-43443

[51] Int. Cl.³ .................... G03B 1/40; G03B 17/02
[52] U.S. Cl. ................................ 354/214; 354/288
[58] Field of Search ................... 354/204–206, 354/212–216, 288

[56] References Cited

U.S. PATENT DOCUMENTS 3,096,699  7/1963  Harvey et al. ............. 354/288 X
3,276,341 10/1966  Kremp et al. .............. 354/212
3,602,121  8/1971  Ernisse ...................... 354/212

Primary Examiner—John Gonzales
Attorney, Agent, or Firm—Toren, McGeady and Stanger

[57] ABSTRACT

A film feeding device for a camera having a rewind fork axially movable to release the spool hub of a film cartridge from the coupling connection therewith when exchanging the exposed film cartridge, wherein a sensing member is provided for detecting either when a fresh film cartridge is inserted into and seated in a chamber within the camera housing at a prescribed position, or when the back cover of the camera is closed, whereby when either one of the two events occurs, the aforesaid rewind fork is caused to return to the engaging position with the spool hub.

11 Claims, 6 Drawing Figures

FILM FEEDING DEVICE FOR CAMERA

BACKGROUND OF THE INVENTION

1. Field of the Invention

This invention relates to film feeding devices for cameras, and more particularly to film feeding devices of the type in which when exchanging a film cartridge, the rewind fork is axially moved to release the spool hub of the cartridge from the engagement with the rewind fork.

2. Description of the Prior Art

In cameras using 35mm film contained in cartridges, the means for permitting the cartridge to be put into and taken out of the cartridge chamber within the camera housing have forms which may be divided into the following two main classes.

One is of the type wherein the rewind fork of the camera is restrained from axial movement, and the size of the cartridge chamber is increased in the vertical direction (a direction parallel to the axis of the rewind fork), or the bottom wall of the cartridge chamber which is opposite to the rewind fork is provided with a cutout, whereby without creating an obstacle to the operation of bringing the key of the film spool of the cartridge (hereinafter described as "cartridge hub") into driven engagement by the rewind fork, loading and unloading of the cartridge is made possible. The other form which has been adopted by many up-to-date cameras is that the rewind fork is made axially movable so that with the rewind fork is retracted from the cartridge chamber, the operator can put in and take out the cartridge. According to this latter form, the size of the cartridge chamber can be minimized, and the degree of flexibility of the space in the vertical direction of the cartridge chamber can be improved in an advantageous manner due to a minimization of the bulk and size of the camera.

However, in such a camera, in order to exchange the exposed cartridge for a fresh one, the required steps include: axially moving the rewind fork to effect disengagement from the cartridge hub, removing the exposed cartridge from the chamber followed by putting in the fresh cartridge, and returning the rewind fork to the initial position for operative connection with the spool hub of the fresh film cartridge. Thus, the process for exchanging the cartridges can becomes troublesome. For this reason, according to the prior art, to simplify the exchanging operation, there has been proposed a device cooperating with the locking mechanism for locking the back cover of the camera in the closed position in such a manner that when the back cover is opened by releasing the locking mechanism, the rewind fork is disengaged from the cartridge hub, and when the back cover is closed, the rewind fork is automatically brought into engagement with the cartridge hub. Such a device can disclosed in U.S. Patent No. 3,096,699. Clearly, such a device can facilitate some of operations necessary to exchange the cartridges, and since the photographer needs to do little more than handling the cartridges, exchanging of the cartridges can be performed quickly and with ease. But, on the other hand, an alternate drawback arises in that a pull cannot be exerted on the film unless the back cover is closed. More specifically, with such a conventional device, when the back cover is in the open position, after the new cartridge has been placed in the empty chamber a difficult handling operation is encountered since the leader of the film must be pulled out of the cartridge far enough so the photographer can attach it to the camera side takeup spool. This is because the rewind fork is not in engagement with the cartridge hub when the cover is open and thus it is hardly possible to make sure the sprockets engage the film perforations.

Also in application to cameras of the so-called autoloading type in which all the photographer needs to do to make the film ready to be advanced is to bring the film leader into engagement with the spool shaft of the camera side and then to close the back cover. It follows that, since the cartridge cannot be retained in the chamber until the back cover is closed, the removal of the operator's finger from the cartridge for example, just before the closure of the back cover often results in a backward turn of the cartridge by curling of the film. Therefore, there is the possibility that the film pullout slit in the cartridge casing will not be oriented towards the takeup spool when the back cover is closed. As a matter of course, under such condition, feeding of the film cannot be carried out, even though the rewind fork is engaged with the cartridge hub by closing the back cover. In addition, if the operator is not aware of such an accident, he will repeat fruitless camera actuations which do not expose new film.

Thus, conventional devices give rise to an additional problem in that when applied to the auto-loading type of cameras the reliability of the film feeding control cannot be improved.

SUMMARY OF THE INVENTION

With the foregoing in mind, it is an object of the present invention to provide a film feeding device for a camera capable of permitting an exchange of cartridges to be carried out by very simple operations and with high reliability.

Briefly, the present invention may be described as a film feeding device for a camera wherein a rewind fork is moved from a first position in engagement with a film cartridge spool shaft to a second position disengaged therefrom, with the rewind shaft being automatically returned to the first position in response to either insertion of a film cartridge into the camera or closure of the back cover of the camera.

This and other objects of the invention will become apparent from the following detailed description of an embodiment thereof taken in connection with the accompanying drawings.

DETAILED DESCRIPTION OF THE PREFERRED EMBODIMENT

Figure 1:
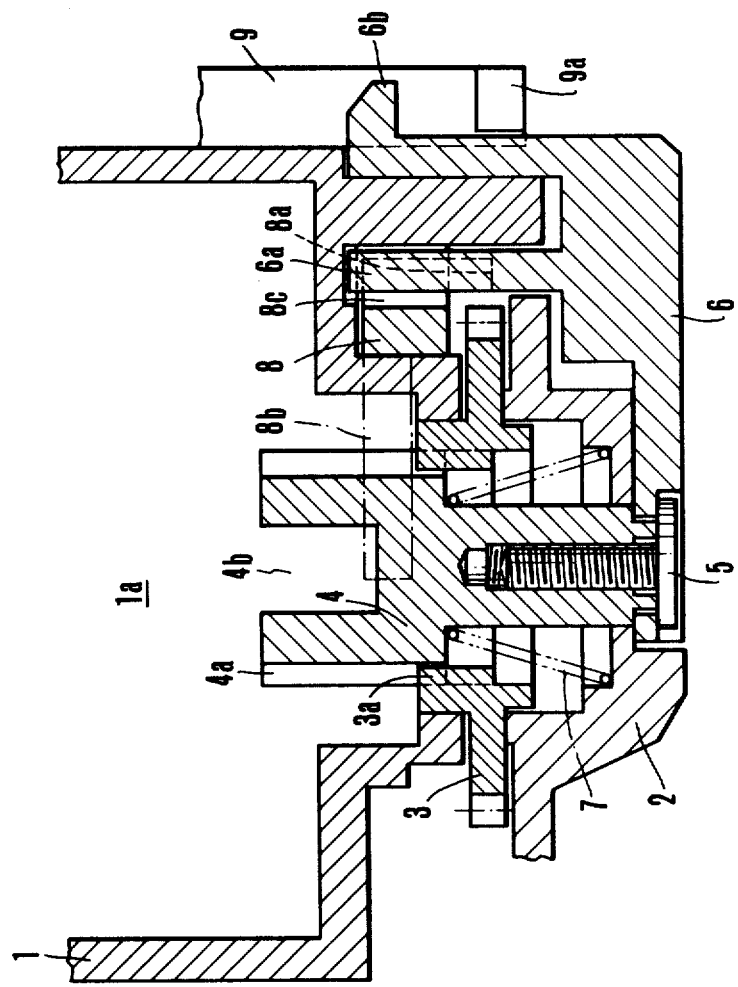
FIG. 1 is a partial sectional elevational view of an embodiment of a film feeding device for a camera according to the present invention.

In FIG. 1 the invention is shown as comprising a camera body 1 having formed therein a cartridge chamber 1a with a cover 2 on the bottom of the camera body 1 in fixedly secured relation thereto by means (not shown). A gear 3 driving a rewind fork 4 is connected through a gear train to an electric motor (not shown) so that when in the rewind mode, the gear 3 is rotated by the driving torque of the motor. The rewind fork 4 is provided with a pair of grooved portions 4a (see FIG. 2) formed in the outer peripheral surface along the axial directions thereof and in which are fitted respective projected portions 3a of the gear 3 so that while the rewind fork 4 is allowed to axially move relative to the gear 3, motion of the gear 3 is transmitted to the rewind fork 4. 4b is a recessed portion of the rewind fork 4 arranged upon engagement with a key (not shown) of the cartridge spool shaft 12a to retain the cartridge 12 in the chamber 1a and upon rewinding operation of a film F to transmit motion of the rewinding fork 4 to the cartridge spool 12a.

Figure 2:
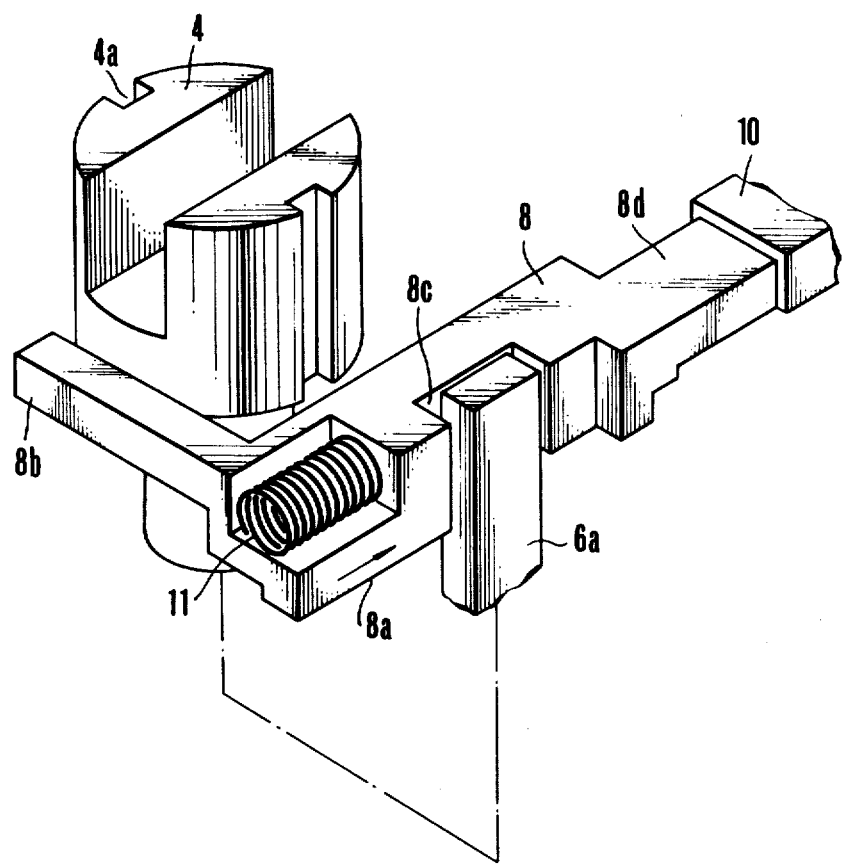
FIG. 2 is a perspective view of the device of FIG. 1 with the rewind fork in the cartridge-engaging position.
Figure 3:
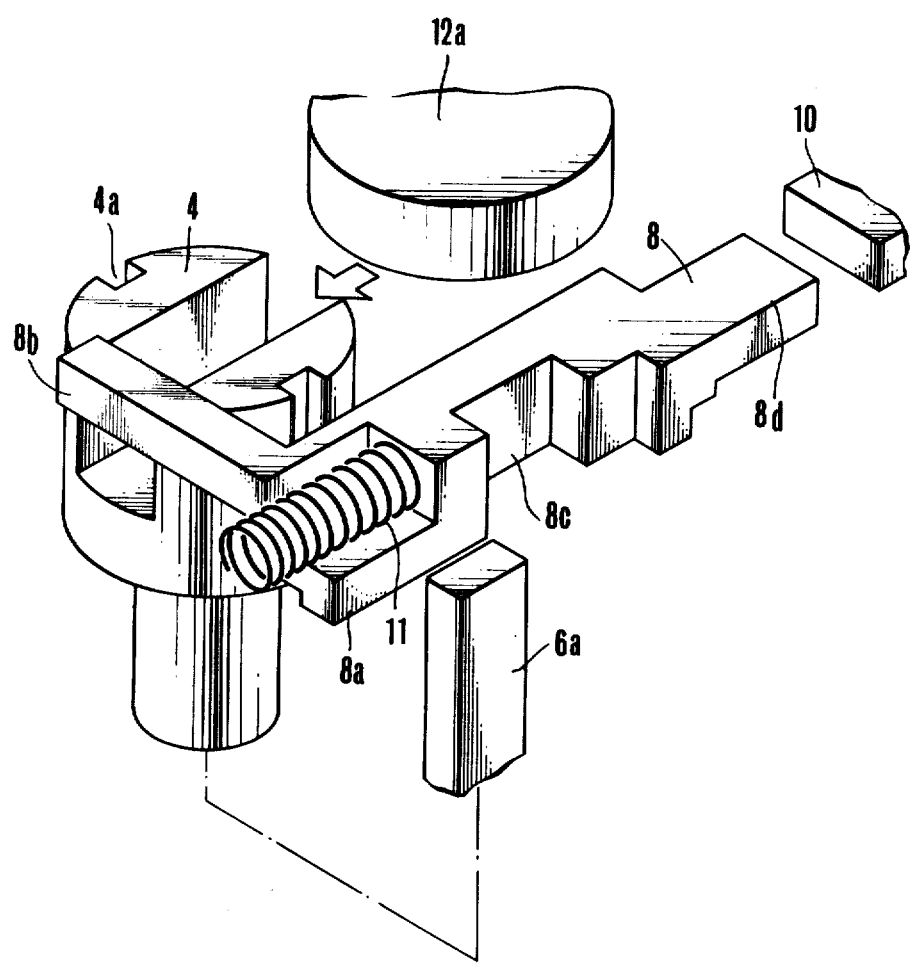
FIG. 3 is a similar view of the device with the rewind fork in the disengaged position.
Figure 4:
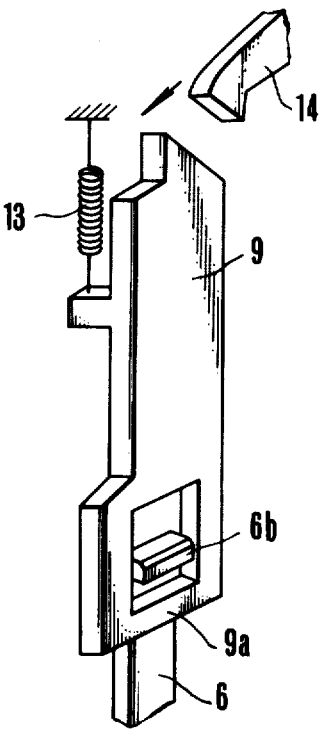
FIG. 4 is a perspective view illustrating an operative connection between the device of FIGS. 1 to 3 and the back cover locking mechanism.

6 is a fork knob on which the rewind fork 4 is rotatably supported through a screw 5. 7 is a compression spring urging the rewind fork 4 to move upwards as viewed in FIG. 1. 8 is a sensing member supported so as to be slidingly movable in a direction in which the cartridge is inserted. As illustrated in FIGS. 2 and 3, this sensing member 8 is provided with an abutment 8a on which the top end of a post 6a of the fork knob 6 rests when the fork knob 6 is moved downwards from the illustrated position of FIG. 1. The sensing member 8 includes a probe or arm 8b extending into the path of movement of the spool shaft 12a of the cartridge, a second probe 8d arranged upon closure of a back cover (not shown) to contact with an extension 10 of the back cover, and a detent recess 8c arranged upon attainment of the position of FIG. 2 to engage the post 6a of the fork knob 6. Also as illustrated in FIG. 4, 9 is a locking bar which upon engagement with a hook 14 of the back cover (not shown) to holds the back cover in the closed position. A tension spring 13 urges the locking bar 9 upwards as viewed in FIG. 4. The locking bar 9 has an engaging portion for a lug 6b of the fork knob 6. A compression coil spring 11 urges the sensing member 8 in a direction indicated by the arrow in FIG. 2.

With regard to the operation of the device described above, in FIG. 2, the sensing member 8 is shown urged in the direction toward the back cover (the direction indicated by arrow) by the compression coil spring 11. But, since when the back cover is closed, the extension 10 of the back cover is in pressing contact on the second probe 8d of the sensing member 8, the sensing member 8 assumes the position of FIG. 2 against the bias force of the spring 11. In this position, the post 6a of the fork knob 6 engages the detent recess 8c of the sensing member 8, and the lug 6b of FIG. 1 does not act on the engaging portion 9a of the locking bar 9. Therefore, the back cover is locked in the closed position, and the rewind fork 4 is held with its forked portions protruding in the interior of the cartridge chamber 1a under the action of the spring 7.

From this position, in order to open the back cover, when the fork knob 6 is pushed down by a predetermined stroke, the lug 6b of the fork knob 6 comes to engage the engaging portion 9a of the locking bar 9. Therefore, with the subsequent further downward movement of the fork knob 6, the locking bar 9 is moved downwards as viewed in the drawings against the bias force of the spring 13 as illustrated in FIG. 4, whereby the hook 14 is released from the locking connection, and the back cover is opened. Thus, the pressing contact of the extension 10 and the sensing member 8 is released. After that, upon further downward movement of the fork knob 6, the post 6a is moved away from the detent slot 8c of the sensing member, permitting the sensing member 8 to move toward the back cover (in the direction indicated by arrow) under the action of the spring 11 and its abutment 8a is placed just above the top end of the post 6a.

Furthermore, responsive to downward pull of the fork knob 6 the rewind fork 4 also moves downwards as viewed in the drawings against the bias force of the spring 7, until its forked portions 4b retract from the cartridge chamber 1a as illustrated in FIG. 3. Then, as the top end of the post 6a of the fork knob 6 rests on the abutment 8a of the sensing member 8, the rewind fork 4 is held stationary in the retracted position. It is to be noted that, at this time, it becomes possible to insert the cartridge 12 into the chamber 1a and the sensing arm 8b of the sensing member 8 is positioned above the forked portions 4b to become sensitive to the cartridge spool 12a when the cartridge 12 is inserted into the chamber 1a.

Then, in order to return the device from the position of FIG. 3 to the position of FIG. 2, the operator must either close the back cover (not shown), or seat the cartridge 12 in the chamber 1a. That is, when the rear end 8d of the sensing member 8 is pushed down by the extension 10 of the back cover 10, the abutment 8a is moved away from the post 6a of the fork knob 6. Then the fork knob 6 and the rewind fork 4 move upwards under the action of the spring 7, causing the forked portions alongside the recess 4b to protrude into the cartridge chamber 1a, and the post 6a to engage the detect recess 8c of the sensing member 8. Thus, the position of FIG. 2 is regained.

Otherwise, with the back cover left opened, when the cartridge 12 is pushed into the interior of the chamber 1a, the long end of the cartridge spool 12a comes into contact at its side with the arm 8b of the sensing member 8, and pushes the sensing member 8 forwards against the bias force of the spring 11. After that, when the cartridge 12 reaches a prescribed position, the post 6a engages the detent recess 8c, and the forked portions of the rewind fork 4 move upwards as viewed in the drawing to enter the hub of the cartridge spool 12a. The pushing down of the cartridge 12 may be carried out either directly or by closing the back cover to effect the same result. It is also to be noted that to open the back cover and to take out the cartridge 12, one need only pull down the fork knob 6 as has been described before. By this, the back cover is opened and then the cartridge 12 is pushed out by the arm 8b of the sensing member 8. Then, the fork knob 6 is retained in the pulled position. It is to be noted that in the above-described embodiment, the pushing down stroke of the sensing member 8 by the extension 10 of the back cover is larger than that by the cartridge 12. This is because the arm 8b would be otherwise set in contact with the cartridge spool by the closed back cover, thereby imparting an unnecessary load (such as the frictional force of the arm 8 thereon) to the film while being fed.

It is to be further noted that the member for detecting when the cartridge 12 is inserted may be of another form that is sensitive to the casing of the cartridge. If so, there is an advantage that the cartridge 12 in the pushed down position can be restrained from rotative movement by the friction on the cartridge casing as the rewind fork 4 returns. This feature is particularly important when applied to cameras having a mechanism for auto-loading film. In order to increase the restraining effect, the contacting area of the sensing member may be increased by conformation to the outer periphery of the cartridge and further its surface may be made to have a high friction.

Figure 5A:
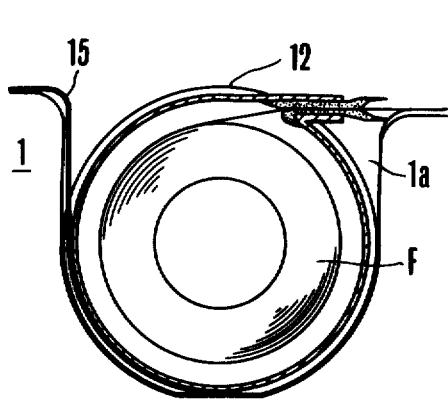
FIGS. 5(a) and 5(b) are plan views of the cartridge when seated in its chamber and when popping up in response to actuation of the device of FIGS. 1 to 3.
Figure 5B:
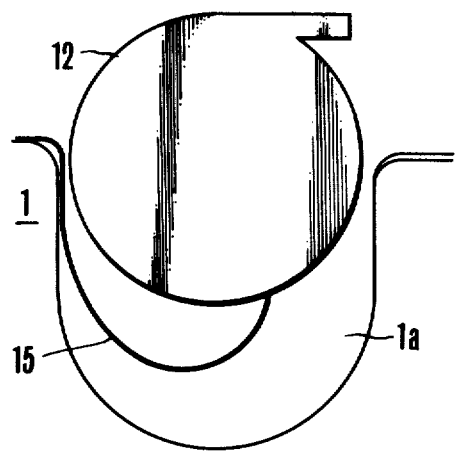

Further, in FIGS. 5(a) and 5(b), 15 is a leaf spring of which one end is fixed to the camera body 1, and of which the opposite or free end lies in the cartridge chamber 1a. Again, this spring 15 is bent to an arcuate form so that when its free end is pushed down by the cartridge 12, the arc is deformed against the resilient force so as to be widened until it conforms with the side wall of the cartridge chamber 1a. Therefore, when the cartridge 12 is seated in the chamber 1a and the rewind fork 4 engages the cartridge spool 12a, the cartridge 12 can be restrained from rotative movement by the frictional force of the spring 15, and also it cooperates with the rewind fork 4 to retain the cartridge in the desired angular position. Also when the cartridge 12 is to be removed, if functions to push out the cartridge 12 from the position of FIG. 5(a) to the position of FIG. 5(b).

It is to be noted that the sensing member may be otherwise arranged to detect deformation of this spring 15 which represents whether or not the chamber contains a cartridge.

As has been described in greater detail, according to the feeding device of the present invention, to load the camera, the operator needs only to put a cartridge into the chamber, whereby the rewind fork is automatically brought into engagement with the spool hub. As the cartridge sustaining operation is simplified, the operator can make sure the leader of the film will connect to the takeup spool and the teeth of the sprocket engage the film perforations. Another feature of the present invention is that detection of when the cartridge is inserted is enabled with the help of the long end of the cartridge spool. Therefore, all the parts of the sensing mechanism can be arranged in one area beneath the cartridge chamber, with the advantage that the bulk and size of the feeding device can be minimized. Still another feature is that the device is made sensitive even to the closure of the back cover, and, when the closure of the back cover is detected, the sensing member is taken out of contact with the cartridge spool. Therefore, the rewind fork can be made to return independently whether or not the cartridge is inserted, and no excessive load is applied on the cartridge spool when the film is advanced.

Further, according to the present invention, the cartridge is made to pop up in automatic response to retraction of the rewind fork from the chamber, whereby removal of the exposed film cartridge can be performed quickly and with ease. Particularly in application to motor driven cameras, a great advantage can be expected.

Though the present invention has been described in connection with the embodiment applied to cameras using 35mm film cartridges, it is to be understood that the present invention is not confined thereto. For example, 110 type film cartridge loading cameras can employ a form of the present invention in the fork engaging the takeup spool of that cartridge.

While a specific embodiment of the invention has been shown and described in detail to illustrate the application of the inventive principles, it will be understood that the invention may be embodied otherwise without departing from such principles.

What is claimed is:

1. A film feeding device for a camera adapted to receive film cartridges and including a rewind fork which is moved from a first position to a second position where engagement between a spool shaft of said cartridge and the rewind fork is released, comprising:
    (a) holding means for holding said rewind fork in said second position;
    (b) sensing means responsive to both insertion of a cartridge into a cartridge chamber of said camera and closure of a back cover of said camera for releasing said rewind fork from the holding connection with said holding means; and
    (c) bias means urging said rewind fork towards said first position.

2. A device according to claim 1, further including:
    (d) transmitting means for transmitting rotative force to the rewind fork, said transmitting means being arranged to be movable in the direction of an axis of the rewind fork and to rotate as a unit with the rewind fork.

3. A film feeding device for a camera adapted to receive film cartridges and including a rewind fork which is moved from a first position to a second position where a spool shaft of said cartridge is released from engagement with said rewind fork, comprising:
    (a) a sensing member having a first portion for detecting insertion of a film cartridge in a cartridge chamber of said camera and a second portion for detecting closure of a back cover of said camera;
    (b) an engaging member arranged to disengage from said sensing member in response to detecting operation of said sensing member, said engaging member being drivenly connected to said rewind fork; and
    (c) bias means urging said rewind fork towards said first position.

4. A device according to claim 3, wherein said sensing member is arranged to slide in a direction in which the cartridge is inserted into said camera.

5. A device according to claim 4, further including:
    (d) bias means urging the sensing member towards the back cover of the camera.

6. A device according to claim 3, wherein said first portion of said sensing member is arranged upon contact with the spool shaft of said cartridge to detect when the cartridge is seated in said camera.

7. A device according to claim 6, wherein when said second portion of said sensing member contacts the back cover of the camera, said first portion is released from contact with the spool shaft.

8. A film feeding device for a camera adapted to receive film cartridges and including a takeup fork which is moved from a first position to a second position where the spool shaft of said cartridge is released from engagement with the takeup fork, comprising:
    (a) a sensing member having a first portion for detecting insertion of a film cartridge into a cartridge chamber of said camera and a second portion for detecting closure of the back cover of said camera;
    (b) a control member having an engaging portion arranged to be released from engagement in response to detecting operation of said sensing member, and operable from the outside of the camera, said takeup fork being rotatably supported on said control member; and (c) bias means urging said takeup fork to said first position.

9. A device according to claim 8, further comprising
(d) a locking member for locking the back cover of said camera in the closed position, said locking member being rendered cooperative with the control member at an intermediate point during the movement of the takeup fork from said first position to said second position to effect opening of the back cover.

10. A device according to claim 9 further comprising:
(e) bias means provided in the cartridge chamber of said camera and urging said film cartridge towards the back cover of the camera.

11. A device according to claim 10, wherein said bias means is a leaf spring having a fixed end and a free end with its entire body formed to an arcuate shape.

* * * * *